United States Patent [19]

Mocaër et al.

[11] Patent Number: 5,573,603
[45] Date of Patent: Nov. 12, 1996

[54] METHOD OF MAKING A SOLID MAGNETIC MATERIAL FROM $SM_2 FE_{17} N_{3-x}$ TYPE INTERMETALLIC NITRIDE POWDER

[75] Inventors: Philippe Mocaër, Jouy en Josas; Patrick Dubots, Neauphle le Chateau; Christian Belouet, Sceaux, all of France

[73] Assignee: Alcatel Alsthom Compagnie Generale d'Electricite, Paris Cedex, France

[21] Appl. No.: 396,722

[22] Filed: Mar. 1, 1995

[30] Foreign Application Priority Data

Mar. 2, 1994 [FR] France ................. 94 02389

[51] Int. Cl.⁶ ........................... H01F 1/057
[52] U.S. Cl. ........................... 148/104; 148/103
[58] Field of Search ................. 148/101, 103, 148/104

[56] References Cited

U.S. PATENT DOCUMENTS 5,137,587  4/1992  Schultz et al. .......... 148/103
5,395,459  3/1995  Pinkerton et al. ....... 148/101

FOREIGN PATENT DOCUMENTS

0248665A3  12/1987  European Pat. Off. .

OTHER PUBLICATIONS

*Patent Abstracts of Japan*, vol. 15, No. 135 (E–1052) 4 Apr. 1991, & JP–A–03 016 102 (Asahi Chem Ind Co Ltd) 24 Jan. 1991.

*Patent Abstracts of Japan*, vol. 17, No. 230 (E–1361) 11 May 1993 & JP–A–04 360 501 (Daido Steel Co Ltd) 14 Dec. 1992.

*Patent Abstracts of Japan*, vol. 17, No. 538 (E–14440) 28 Sep. 1993 & JP–A–05 152 116 (F. Teruhiko) 18 Jun. 1993.

French Search Report FR 9402389.

*Primary Examiner*—John Sheehan
*Attorney, Agent, or Firm*—Sughrue, Mion, Zinn, Macpeak & Seas

[57] ABSTRACT

A method of making a solid magnetic material from $Sm_2 Fe_{17} N_{3-x}$ type intermetallic nitride powder, where $0 \leq x \leq 1$, comprises the following steps:

a—the powder is mixed intimately with glass powder having a conversion temperature Tg between 260° C. and 310° C. and a softening temperature Tf less than 400° C., the proportion of glass powder being between 10% and 30% of the total volume;

b—the mixture is compressed to obtain a solid;

c—the solid obtained is subjected in a neutral gas atmosphere to a heat cycle during which a temperature not less than Tf+5° C. and not more than 420° C. is maintained for at least one hour.

2 Claims, 1 Drawing Sheet

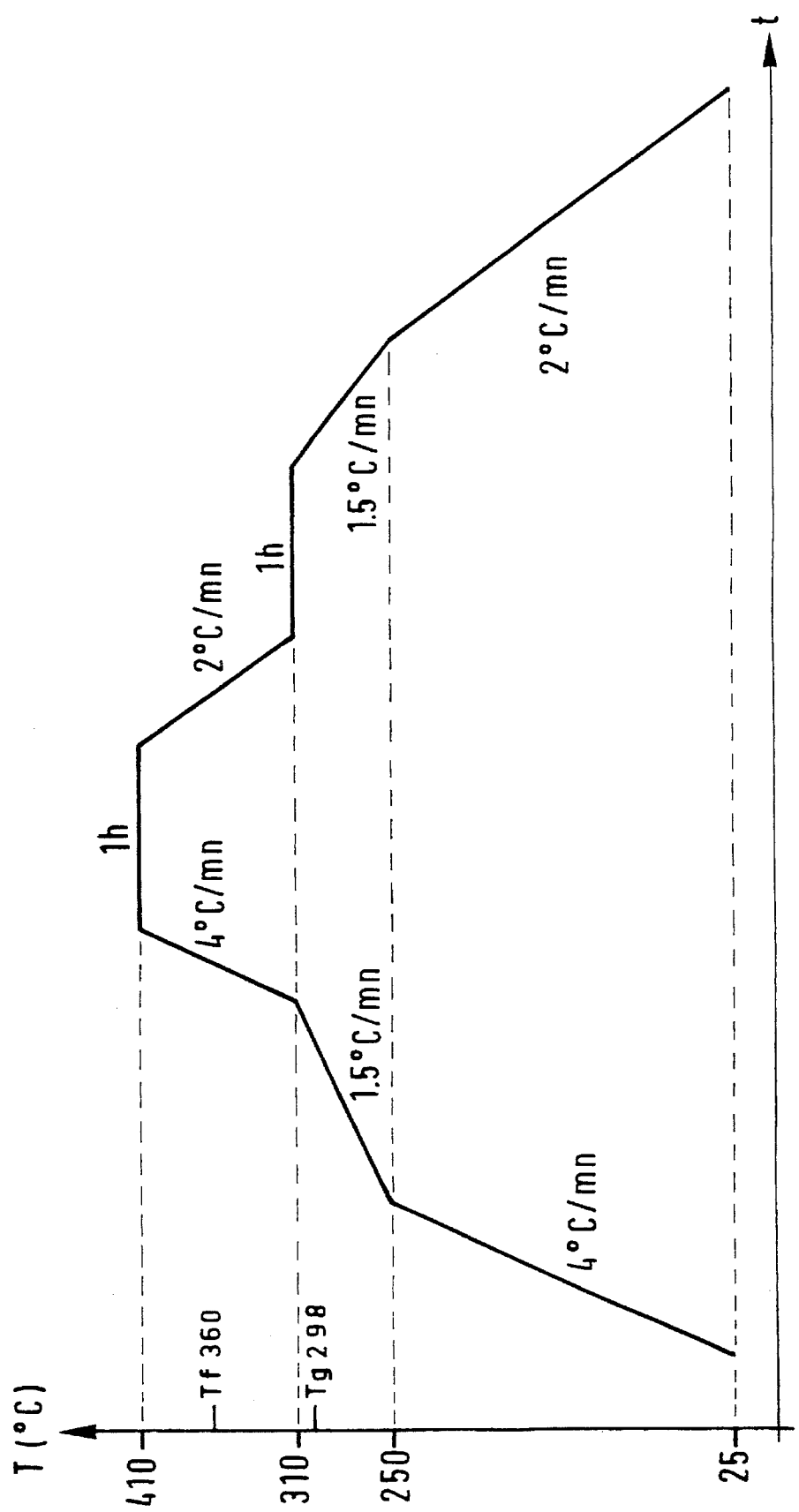

METHOD OF MAKING A SOLID MAGNETIC MATERIAL FROM $Sm_2 Fe_{17} N_{3-x}$ TYPE INTERMETALLIC NITRIDE POWDER

BACKGROUND OF THE INVENTION

1. Field of the Invention

The present invention concerns a method of making a solid magnetic material from $Sm_2 Fe_{17} N_{3-x}$ type intermetallic nitride powder, where $0 \leq x \leq 1$, and where preferably $0.2 \leq x \leq 0.7$.

2. Description of the Prior Art

This type of material, recently produced by J. M. D. COEY and sometimes called "Nitromag", has beneficial intrinsic properties:

Curie point: 475° C.

Saturation limit: $\mu o\ M_s = 1.54$ T.

Theoretical maximum limit on energy product (BH) (maximum magnetic energy stored): 471 kJ/m$^3$.

Anisotropic field at room temperature: $\mu o\ Ha = 14$ T.

A high coercive field $H_c$ and a high remanent magnetic induction $B_r$ can be achieved with this material.

However, the material is in powder form and the problem arises of converting it to a solid block.

Materials of this type are metastable and break down at temperatures in the order of 600° C. to 650° C., which means that they cannot be shaped by conventional sintering techniques.

The powder material can be bound with a polymer but the resulting composite material has only a low temperature resistance so that it is difficult to use in electric motors. Also, a composite material of this kind ages badly and is relatively hygroscopic, which rules it out for this type of nitride which must be protected from oxidation.

This kind of powder material can also be bound using a metal binder such as zinc, but interaction then occurs between the binder and the magnetic powder material during synthesis of the composite material, with the result that the magnetic properties of the resulting magnet are degraded relative to those of the starting "Nitromag" powder.

An object of the present invention is to propose a method which avoids these drawbacks and produces a solid body which is mechanically stable at temperatures up to 260° C., resistant to oxidation and retains the magnetic properties of the starting powder. A composite material of this kind can therefore be used as magnet, for example in motors.

SUMMARY OF THE INVENTION

The invention consists in a method of making a solid magnetic material from $Sm_2 Fe_{17} N_{3-x}$ type intermetallic nitride powder, where $0 \leq x \leq 1$, comprising the following steps:

a—said powder is mixed intimately with glass powder having a conversion temperature Tg between 260° C. and 310° C. and a softening temperature Tf less than 400° C., the proportion of glass powder being between 10% and 30% of the total volume;

b—the mixture is compressed to obtain a solid;

c—the solid obtained is subjected in a neutral gas atmosphere to a heat cycle during which a temperature not less than Tf+5° C. and not more than 420° C. is maintained for at least one hour.

In accordance with another feature of the invention operation c is carried out in the presence of a magnetic field.

This method produces a composite magnetic material in which the matrix, which is glass, does not interact with the intermetallic nitride. The composite material obtained is resistant to corrosion, the magnetic phase being protected by the glass from chemical attack by the atmosphere.

The material obtained can easily be formed to any required shape by heating it above the transformation temperature Tg which is relatively low.

Finally, the material obtained has low induced current losses, the magnetic particles being isolated from each other by the glass.

BRIEF DESCRIPTION OF THE DRAWING

The single figure appended hereto shows an appropriate heat cycle for the non-limiting example given below.

DETAILED DESCRIPTION OF THE PREFERRED EMBODIMENT

The glass powder used is Schott lead borate soda glass No 8472. Its conversion or annealing temperature Tg, corresponding to a viscosity of $10^{13.4}$ poises, is 298° C. and its softening or Littleton temperature Tf, corresponding to a viscosity of $10^{7.6}$ poises, is 360° C. Its density is 6.75 g/cm$^3$ and its resistivity at 281° C. is $10^8$ ohm-cm.

The glass powder is mixed in a proportion of 10% to 30% by volume with the $Sm_2 Fe_{17} N_{2.3}$ powder and then pressed cold at a pressure of 2 tonnes/cm$^2$ to 5 tonnes/cm$^2$ to obtain a solid that can be handled.

The solid is then placed in a primary vacuum enclosure, i.e. an enclosure evacuated by means of a vane pump, for example, after which a neutral gas such as argon at atmospheric pressure, for example, is introduced into the enclosure. This is so that the heat treatment is carried out in the absence of oxygen and water vapor.

The heat treatment shown in the figure is then carried out.

It comprises a first increasing temperature part during which, in a first step, the temperature is raised to 250° C. at a rate of 4° C./mn followed by a second step in which the temperature is raised to 310° C. at 1.5° C./mn and a third stage to 410° C. at 4° C./mn. There follows a second part in which the temperature is held constant at 410° C. for one hour, followed by a third decreasing temperature part starting with a reduction in the temperature to 310° C. at 2° C./mn, followed by one hour at 310° C., followed by further reduction in temperature to 250° C. at 1.5° C./mn and then reduction to room temperature at 2° C./mn.

This heat cycle, described as one appropriate example for the glass chosen, is not the only possible one.

Because Tg=298° C. and Tf=360° C. for the glass chosen, the cycle must increase the temperature to at least a value between 365° C. and 420° C. and maintain the temperature at this value for at least one hour. The neutral atmosphere employed could comprise nitrogen instead of argon.

The heat cycle shown in the figure can be carried out in the presence of a magnetic field.

There is claimed:

1. A method of making a solid magnetic material from $Sm_2 Fe_{17} N_{3-x}$ intermetallic nitride powder, where $0 \leq x \leq 1$, comprising the steps of:

forming a mixture by mixing said powder intimately with glass powder having a conversion temperature Tg between 260° C. and 310° C. and a softening temperature Tf less than 400° C., the proportion of glass powder being between 10% and 30% of the total volume;

compressing the mixture to obtain a solid; and subjecting the solid obtained in a neutral gas atmosphere to a heat cycle during which a temperature not less than Tf+5° C. and not more than 420° C. is maintained for at least one hour.

2. A method according to claim 1 wherein said subjecting step is carried out in the presence of a magnetic field.

* * * * *